(12) United States Patent
Steelman

(10) Patent No.: US 11,203,428 B2
(45) Date of Patent: Dec. 21, 2021

(54) REMOVABLE AERIAL APPLICATION SYSTEM

(71) Applicant: Airduce, LLC, Cheriton, VA (US)

(72) Inventor: Michael E. Steelman, Cheriton, VA (US)

(73) Assignee: Airduce, LLC, Cheriton, VA (US)

( * ) Notice: Subject to any disclaimer, the term of this patent is extended or adjusted under 35 U.S.C. 154(b) by 0 days.

(21) Appl. No.: 16/209,365

(22) Filed: Dec. 4, 2018

(65) Prior Publication Data

US 2019/0168874 A1 Jun. 6, 2019

Related U.S. Application Data

(60) Provisional application No. 62/594,254, filed on Dec. 4, 2017.

(51) Int. Cl.
| | |
|---|---|
| *B64D 1/18* | (2006.01) |
| *B64C 27/04* | (2006.01) |
| *A01C 17/00* | (2006.01) |
| *A01M 7/00* | (2006.01) |
| *A01C 7/16* | (2006.01) |
| *B05B 13/00* | (2006.01) |

(52) U.S. Cl.
CPC ............... *B64D 1/18* (2013.01); *A01C 7/166* (2013.01); *A01C 17/001* (2013.01); *A01M 7/00* (2013.01); *B05B 13/005* (2013.01); *B64C 27/04* (2013.01)

(58) Field of Classification Search
CPC ......... A01C 17/001; A01C 7/16; A01C 7/166; A01C 7/085; A01M 7/00; A62C 3/0228; A62C 3/0242; B64D 1/16; B64D 1/18; B05B 13/005
See application file for complete search history.

(56) References Cited

U.S. PATENT DOCUMENTS

| | | | | |
|---|---|---|---|---|
| 3,463,398 A | * | 8/1969 | Ward ...................... | B64D 1/16 239/171 |
| 3,559,930 A | * | 2/1971 | Sellards .................. | B64D 1/16 244/136 |
| 3,920,184 A | * | 11/1975 | Waldrum ................. | B64D 1/16 239/10 |
| 3,968,933 A | * | 7/1976 | Waldrum ............... | A01C 7/004 239/171 |
| 4,453,675 A | * | 6/1984 | Kodadek ................ | A01M 1/14 239/171 |

(Continued)

*Primary Examiner* — Alex M Valvis
(74) *Attorney, Agent, or Firm* — Christopher & Weisberg, P.A.

(57) ABSTRACT

A removable aerial application system and a method of installing the removable aerial application system in an aircraft such as a helicopter. In one embodiment, a removable aerial application system for an aircraft comprises: a tank insertable into a cabin of the aircraft; a first delivery conduit and a second delivery conduit, the first and second delivery conduits being in communication with the tank and extending aftward beneath a fuselage of the aircraft, a first auger within the first delivery conduit and a second auger within the second delivery conduit; a collector assembly defining a chamber, each of the first and second delivery conduits being in communication with the chamber; a distribution system coupled to the collector assembly; and a hydraulic system in mechanical communication with each of the first and second augers.

15 Claims, 12 Drawing Sheets

(56) References Cited

U.S. PATENT DOCUMENTS

| | | | | |
|---|---|---|---|---|
| 4,892,255 A | * | 1/1990 | Waldrum | A01M 9/0061 |
| | | | | 239/682 |
| 7,753,314 B2 | * | 7/2010 | Nolan | B64D 1/16 |
| | | | | 244/136 |
| 10,195,471 B2 | * | 2/2019 | Doten | A62C 5/008 |
| 2008/0201994 A1 | * | 8/2008 | Crago | E01H 5/06 |
| | | | | 37/197 |
| 2019/0307058 A1 | * | 10/2019 | Robbins | A01C 14/00 |

* cited by examiner

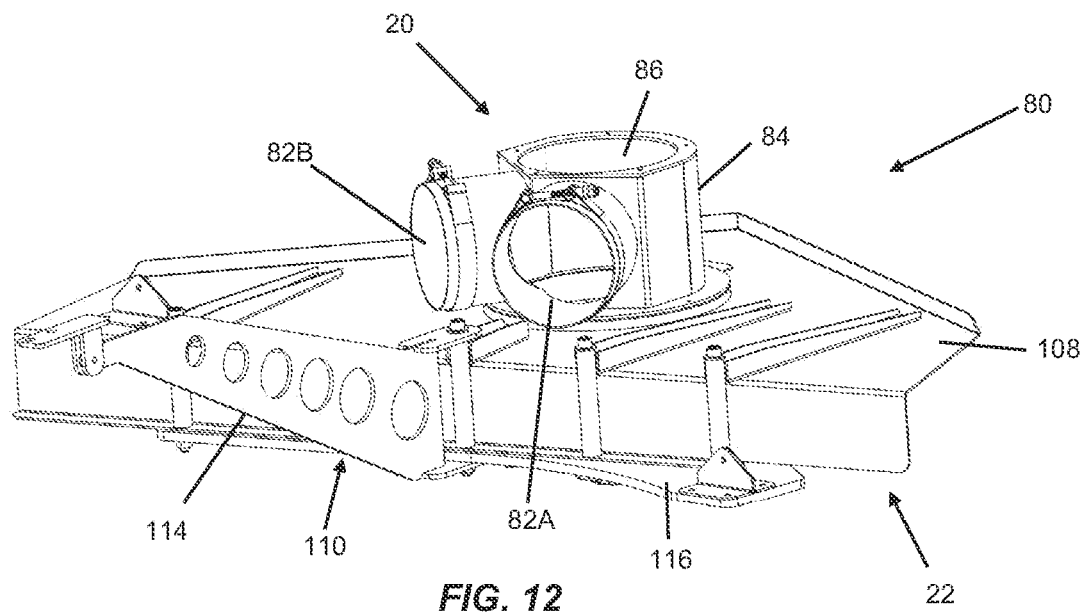
FIG. 12
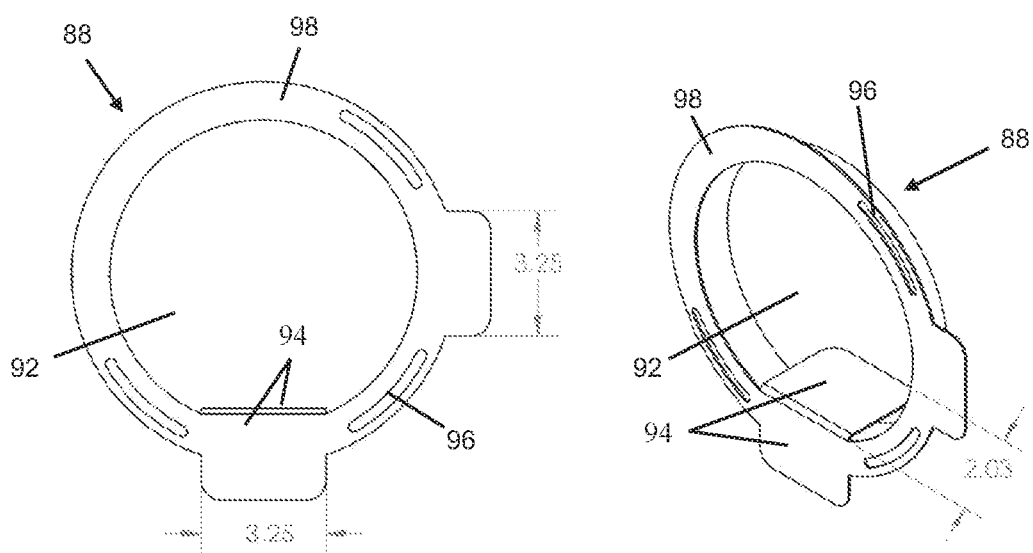
FIG. 13A
FIG. 13B

REMOVABLE AERIAL APPLICATION SYSTEM

CROSS-REFERENCE TO RELATED APPLICATION

This application is a related to and claims priority to U.S. Provisional Application Ser. No. 62/594,254, filed Dec. 4, 2017, the entirety of which is incorporated herein by reference.

FIELD

The present technology is generally related to devices and systems for aerial application of materials to a ground location.

BACKGROUND

The aerial application of wet and dry materials is frequently used in agriculture, fire control, cover crop seeding, and other uses. Currently known aerial application systems are either active systems (such as pump-based systems for applying liquids, including those systems that distribute liquids through nozzles attached to booms that extend from either side of the aircraft) and passive systems (such as slung systems, which include buckets suspended at a distance below the aircraft, and systems that includes chutes or other means for delivering wet or dry materials). Active systems typically include pumps, pressurized fluid, and/or mechanical means for actively metering and delivering materials, whereas passive systems take advantage of relative wind, turbulence, altitude, airspeed, and downwash created by the aircraft to deliver materials.

Each type of system may be advantageously used for a particular task. For example, slung systems are often used for fire suppression, as a large amount of water or other suppression material may be delivered from the basket suspended beneath the aircraft. On the other hand, active systems may be a better option for agricultural seeding, which requires more precision and less volume. For example, boom-and-nozzle systems are typically used to broadcast seed, pesticides, or other materials at a specific application rate and swath.

Many aircraft used for agricultural aerial application are specifically manufactured to include features suited for a particular job, or include extensive aftermarket modifications. However, many of these features and modifications require certification of the aircraft with a restricted category airworthiness certificate, issued by the Federal Aviation Administration (FAA). Such aircraft are restricted to use for the specified operations only (for example, agricultural spraying) and may be restricted to flying in certain space. Although aircraft may be certified in multiple categories, such as having an airworthiness certificates in both restricted and standard categories, the aircraft must be able to meet the requirements of the category in which the aircraft is being operated at the time. Most currently known aircraft features and modifications for agricultural aerial application systems are permanently added/affixed and/or require substantial permanent modifications to the body of the aircraft, resulting in a permanently modified aircraft that cannot meet the requirements of a standard category airworthiness certificate. Thus, these specifically manufactured or modified aircraft are often very expensive, and typically cannot meet the airworthiness requirements of a standard category.

Additionally, most currently known aerial application systems do not allow for precision distribution of seeds or other materials. For example, passive aerial application systems provide very little control over application rate and swath, and slung systems are often not suitable for operation in all agricultural areas. Additionally, many active systems, such as boom-and-nozzle systems, are well-suited for delivery of liquids and suspended particulates, but not for seeds or dry materials.

SUMMARY

The techniques of this disclosure generally relate to an aerial application system for use with and easily removably coupled to an aircraft. In one embodiment, a removable aerial application system for an aircraft comprises: a tank configured to be inserted into a cabin of the aircraft; a first delivery conduit and a second delivery conduit, the first delivery conduit and the second delivery conduit being in communication with the tank and being configured to extend aftward beneath a fuselage of the aircraft; a first auger within the first delivery conduit and a second auger within the second delivery conduit; a collector assembly defining a chamber, each of the first delivery conduit and the second delivery conduit being in communication with the chamber; a distribution assembly coupled to the collector assembly; and a hydraulic system in mechanical communication with each of the first and second augers.

In one aspect of the embodiment, the tank includes a first outlet at a first end and a second outlet at a second end opposite the first end, the tank being configured such that the first outlet is located external to a left side of the aircraft and the second outlet is located external to a right side of the aircraft when the tank is within the cabin of the aircraft. In one aspect of the embodiment, the removable aerial application system further comprises: a first loading conduit extending vertically between the first tank outlet and the first delivery conduit; and a second loading conduit extending vertically between the second tank outlet and the second delivery conduit.

In one aspect of the embodiment, the hydraulic system includes processing circuitry that is programmed to send and receive data from a navigation system of the aircraft. In one aspect of the embodiment, the processing circuitry has a wireless communication module.

In one aspect of the embodiment, the removable aerial application system further comprises a first rotary encoder in communication with the first auger and a second rotary encoder in communication with the second auger, each of the first rotary encoder and the second rotary encoder also being in communication with the processing circuitry of the hydraulic system.

In one aspect of the embodiment, the collector assembly includes a flow diverter having a central aperture and a projection. In one aspect of the embodiment, the flow diverter is adjustable to meter a flow of material from the removable aerial application system In one aspect of the embodiment, the distribution assembly includes a housing that has: a central aperture in communication with the chamber of the collector assembly; a first edge; and a second edge opposite the first edge, the housing being rotated about a vertical axis such that the first edge is more aftward than the second edge.

In one aspect of the embodiment, the distribution assembly includes a spinner in communication with the chamber of the collector assembly. In one aspect of the embodiment, the spinner includes: a first plate and a second plate; and a plurality of baffles extending between the first plate and the second plate, the plurality of baffles, the first plate, and the second plate defining a plurality of passages within the spinner, each of the plurality of passages including an outlet.

In one aspect of the embodiment, the collector assembly includes a body defining the chamber, the body having a first inlet and a second inlet, each of the first inlet and the second inlet having a longitudinal axis, the longitudinal axis of the first inlet and the longitudinal axis of the second inlet being oriented relative to each other at an angle of between approximately 30° and approximately 45°.

In one aspect of the embodiment, the first delivery conduit and the second delivery conduit each have an elongated tubular shape and are composed of a rigid material.

In one aspect of the embodiment, the first loading conduit and the second loading conduit are each composed of a flexible material.

In one embodiment, a removable aerial application system usable with a helicopter having a cabin, at least one landing skid, and a fuselage comprises: a tank configured to be inserted into the cabin, the tank having a first outlet and a second outlet; a delivery unit removably coupled to a pre-existing mounting fixture on a lower surface of the aircraft fuselage at a location that is aftward of the tank; a first loading conduit in communication with the first outlet of the tank and a second loading conduit in communication with the second outlet of the tank; a first delivery conduit and a second delivery conduit each being in communication with the tank and the delivery unit, the first loading conduit extending between the tank and the first delivery conduit and the second loading conduit extending between the tank and the second delivery conduit; a first auger in the first delivery conduit and a second auger in the second delivery conduit; and a hydraulic system in communication with the first auger and the second auger, the hydraulic system being configured to be removably coupled to the landing skids.

In one embodiment, a method of installing a removable aerial application system into an aircraft comprises: coupling a delivery unit of the removable aerial application system to an existing mounting point on a fuselage of the aircraft; coupling a first delivery conduit to a first inlet of the delivery unit and coupling a second delivery conduit to a second inlet of the delivery unit; inserting a tank into a cabin of the aircraft, the tank having a first outlet at a first end and a second outlet at a second end opposite the first end; and coupling a first loading conduit between the first outlet of the tank and the first delivery conduit and coupling a second loading conduit between the second outlet of the tank and the second delivery conduit.

In one aspect of the embodiment, the method further comprises coupling a hydraulic system to a landing skid of the aircraft. In one aspect of the embodiment, a first auger is located within the first delivery conduit and a second auger is located within the second delivery conduit, and the method further comprises coupling the hydraulic system to the first auger and the second auger.

In one aspect of the embodiment, the method further comprises coupling the tank to a seat frame within the cabin of the aircraft.

In one aspect of the embodiment, the method further comprises coupling at least a portion of each of the first delivery conduit and the second delivery conduit to an existing mounting point on the fuselage of the aircraft.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 12 shows a front perspective view of the collector assembly and distribution assembly of FIG. 11;

FIGS. 13A and 13B show a detailed view of a flow diverter of the removable aerial application system;

DETAILED DESCRIPTION

Figure 1:
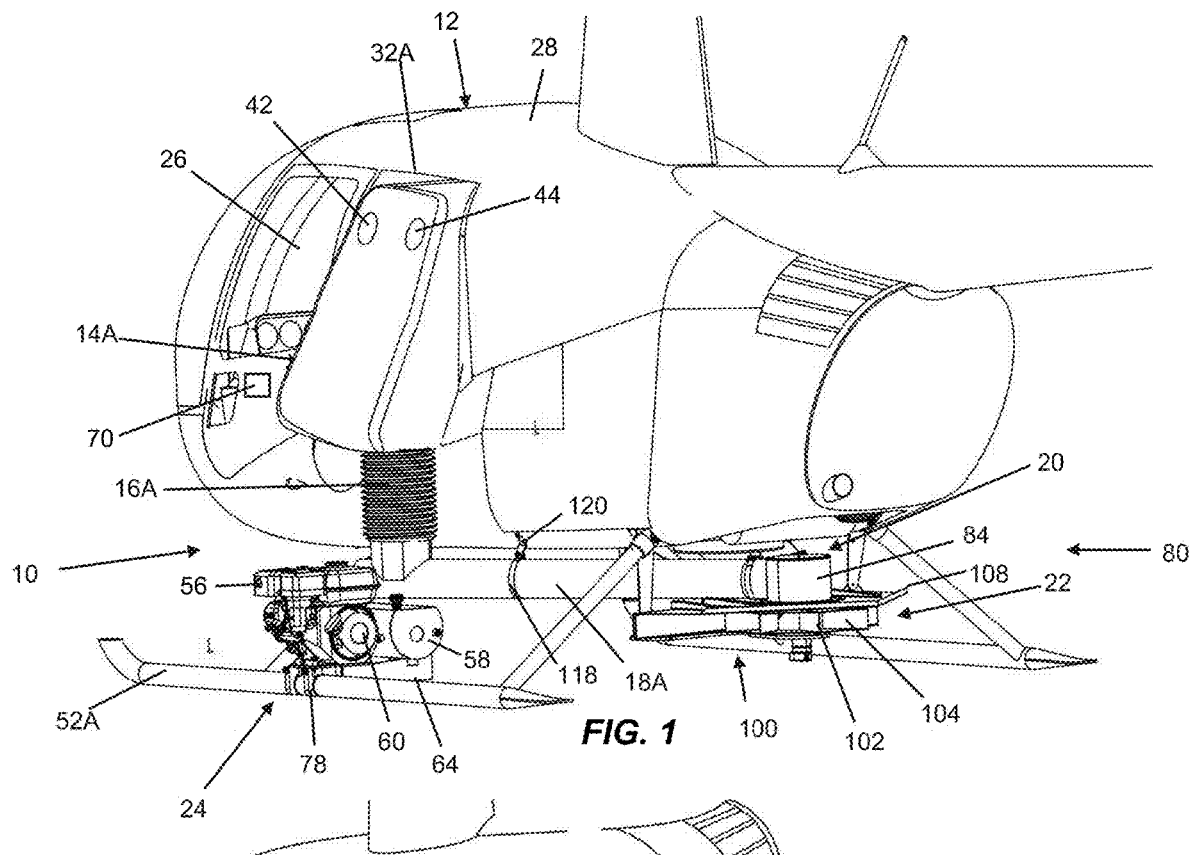
FIG. 1 shows an aft perspective left side view of an aircraft including a removable aerial application system.

Before describing in detail exemplary embodiments, it is noted that the embodiments reside primarily in combinations of apparatus components and method steps related to a removable aerial application system for use with an aircraft. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are capable of achieving the electrical and data communication.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques).

Figure 2:
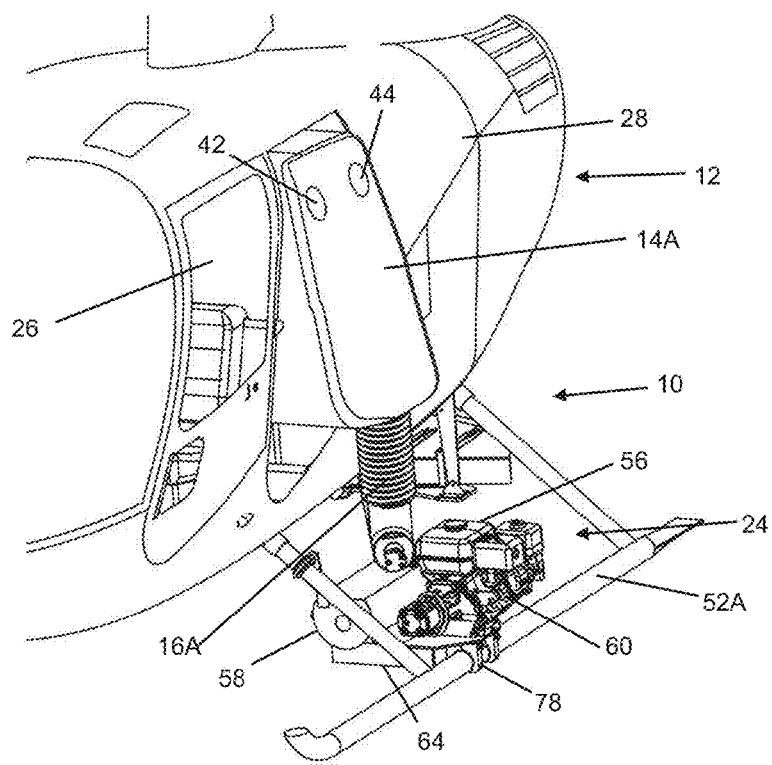
FIG. 2 shows a forward perspective left side view of the aircraft of FIG. 1.
Figure 3:
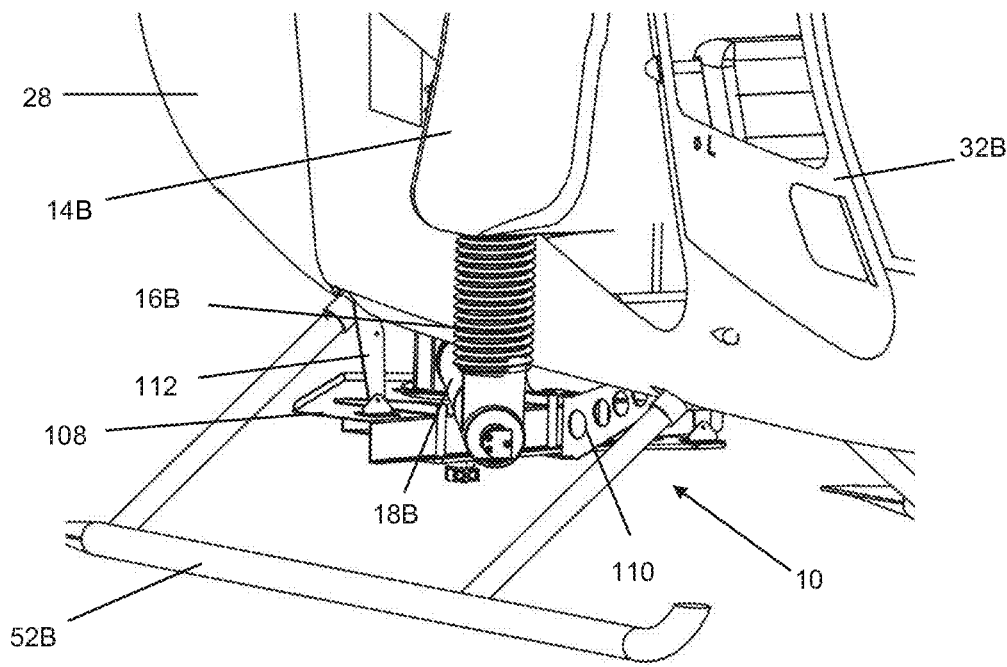
FIG. 3 shows a forward perspective right side view of the aircraft of FIG. 1.
Figure 4:
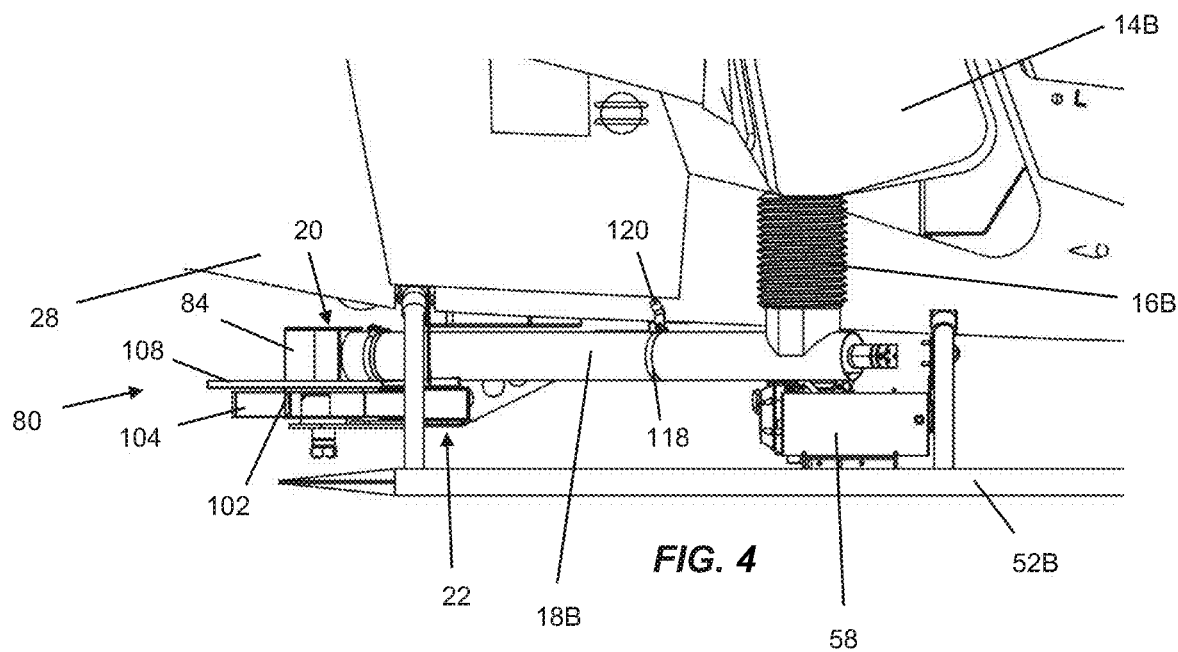
FIG. 4 shows an aft perspective right side view of the aircraft of FIG. 1.
Figure 5:
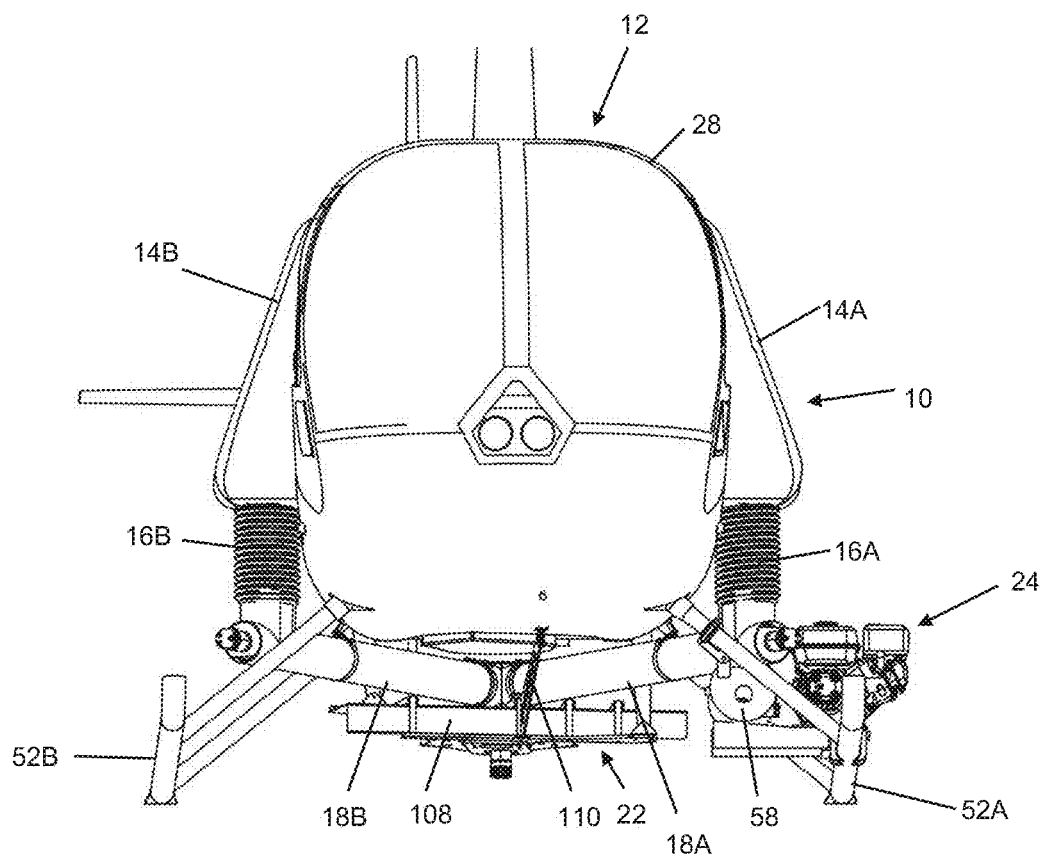
FIG. 5 shows a forward view of the bottom of the aircraft of FIG. 1.
Figure 6:
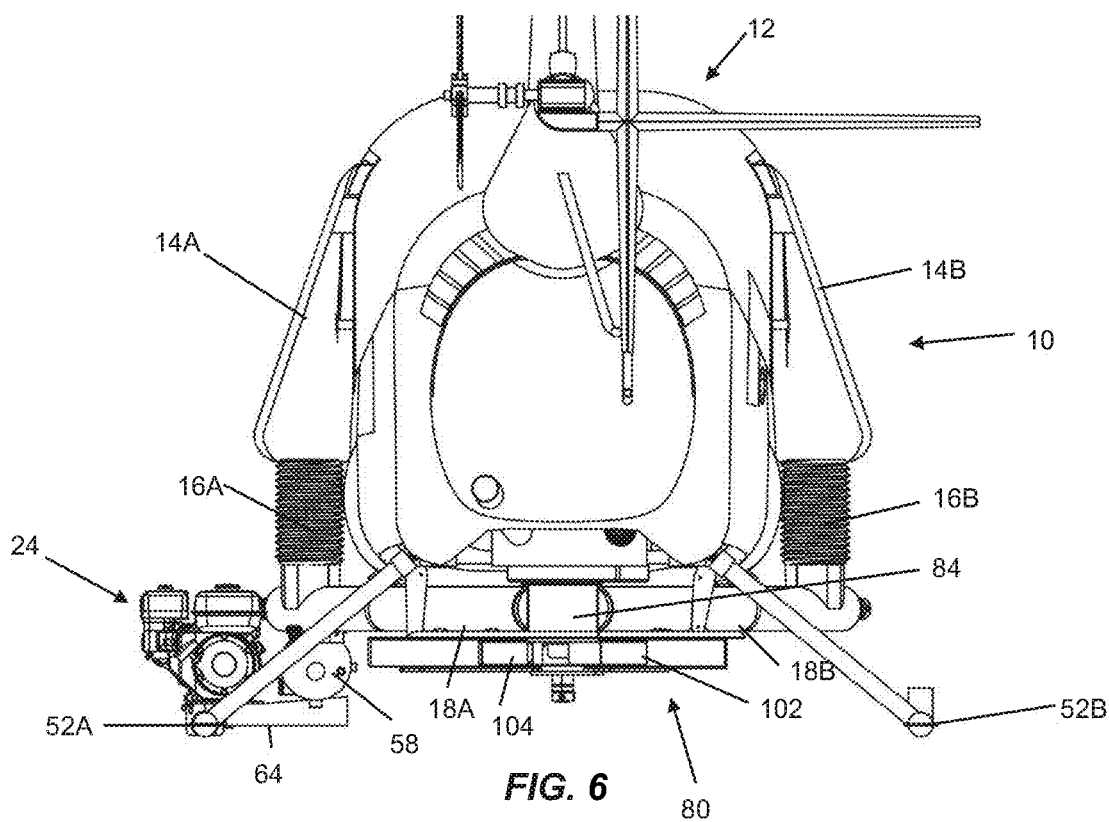
FIG. 6 shows an aft view of the aircraft of FIG. 1.

Referring now to FIGS. 1-6, a removable aerial application system 10 is shown installed on an aircraft 12. FIG. 1 shows an aft perspective left side view of an aircraft 12 including the removable aerial application system 10, FIG. 2 shows a forward perspective left side view thereof, FIG. 3 shows a forward perspective right side view thereof, FIG. 4 shows an aft perspective right side view thereof, FIG. 5 shows a forward view of the bottom of the aircraft 12, and FIG. 6 shows an aft view of the aircraft 12. As is discussed in more detail below, the removable aerial application system 10 can be installed and removed from the aircraft 12 as needed, without requiring significant modifications to the aircraft 12 that would prevent the aircraft from meeting the requirements for standard category airworthiness certification. Therefore, when the removable aerial application system 10 is removed from the aircraft 12, the aircraft 12 can be used for standard category uses. Although the removable aerial application system 10 is discussed herein as being configured for use with dry materials, it will be understood that the removable aerial application system 10 alternatively may be configured for use with liquid or semi-liquid materials.

Figure 16:
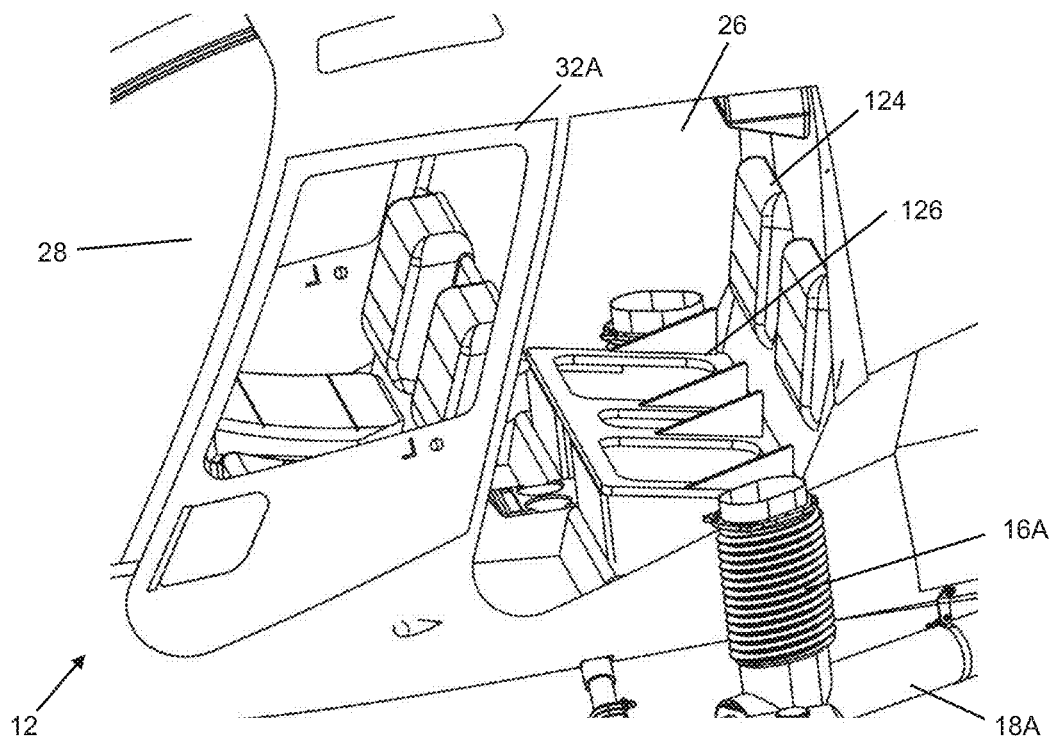
FIG. 16 shows a portion of the cabin of an aircraft suitable for use with the removable aerial application system.
Figure 17:
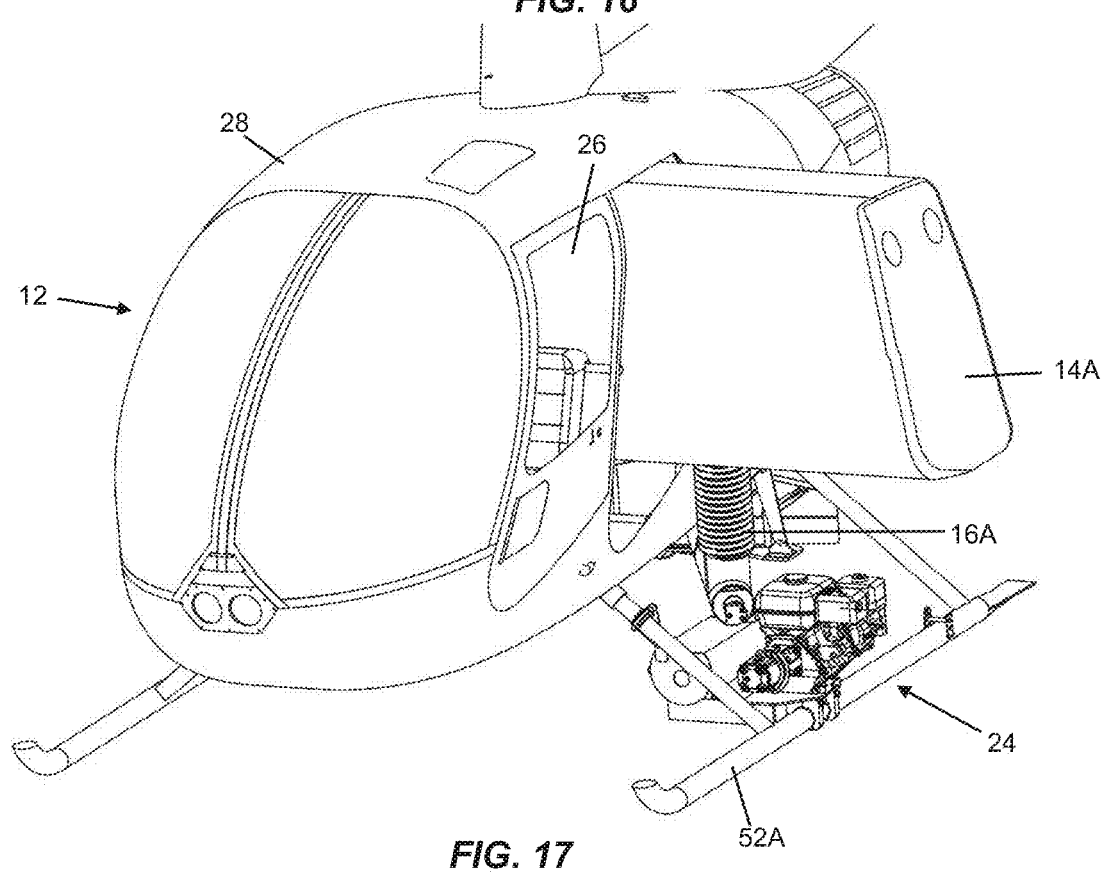
FIG. 17 shows a tank of the removable aerial application system being inserted into the aircraft cabin shown in FIG. 16.

Continuing to refer to FIGS. 1-6, the removable aerial application system 10 generally includes a tank 14, two loading conduits 16, two delivery conduits 18, a collector assembly 20, a distribution assembly 22, and a hydraulic system 24. The tank 14 is sized and configured to fit within the cabin 26 of the aircraft 12 (for example, as shown in FIGS. 16 and 17), such that at least a portion of the tank 14 extends through the rear cabin doors or other side openings in the fuselage 28 of the aircraft 12, although minimally (for example, the tank 14 may not extend beyond the fuselage 28 by a distance of more than approximately 3 ft), to the outside of the aircraft 12. In one embodiment, the tank 14 is sized to hold approximately 19 bushels of material to be distributed. In the embodiment shown in FIGS. 1-6, the tank 14 includes a first end 14A that is external to the left rear cabin door or other opening 32A and a second end 14B that is external to the right rear cabin door or other opening 32B.

Figure 7:
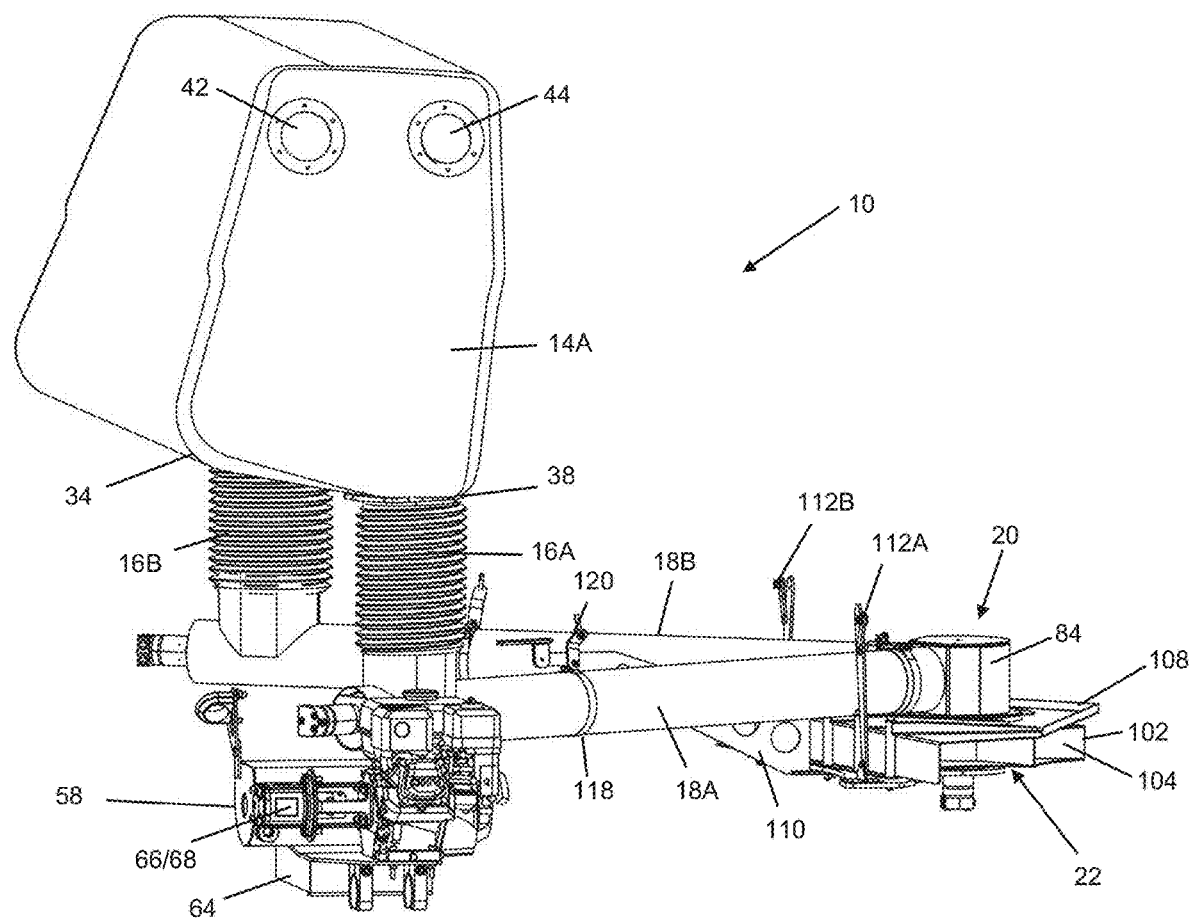
FIG. 7 shows a side view of the removable aerial application system separated from the aircraft.
Figure 8:
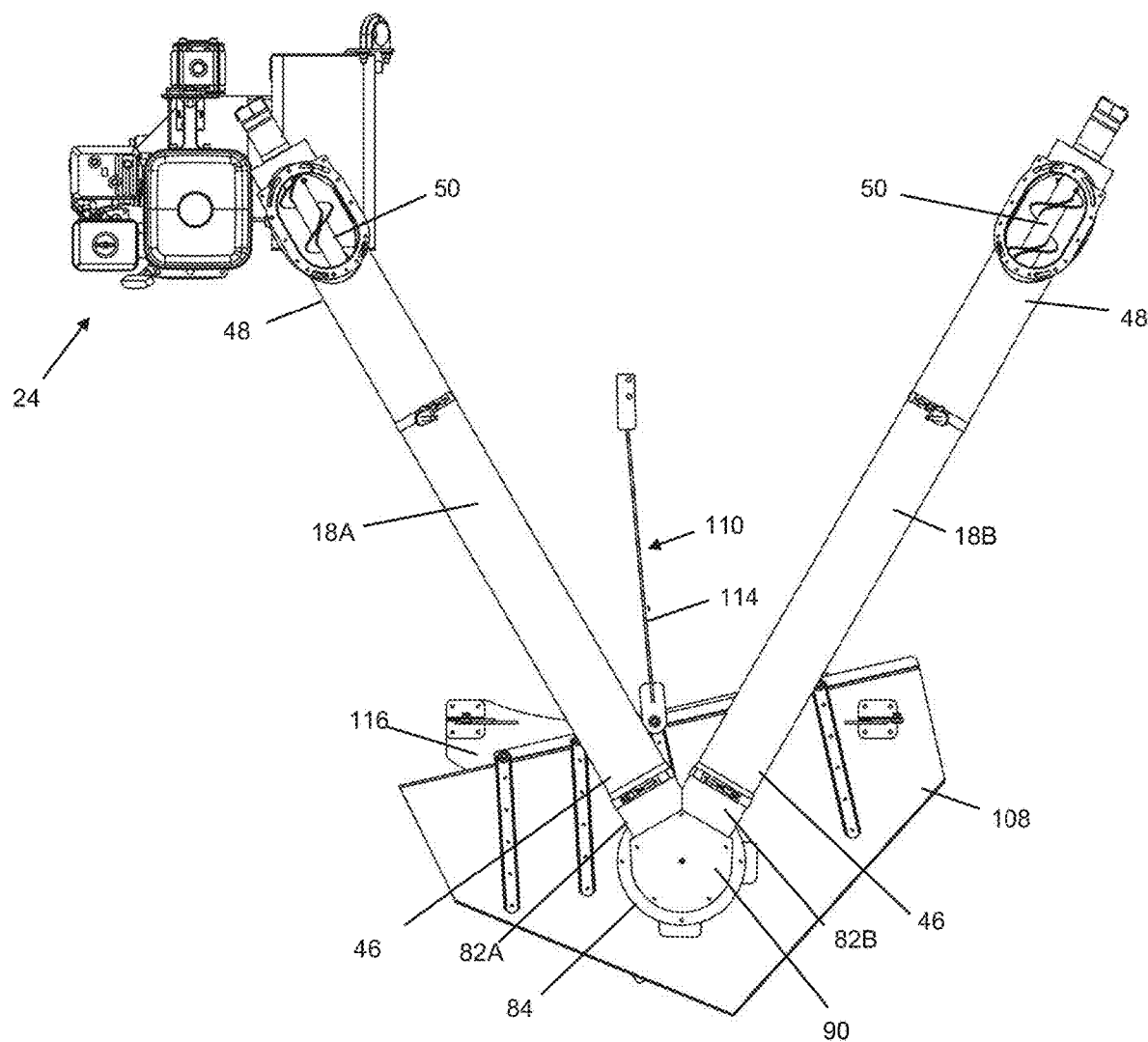
FIG. 8 shows a top view of the removable aerial application system without the tank.
Figure 9:
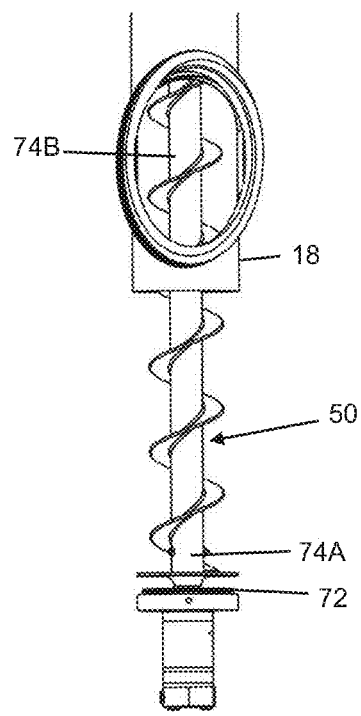
FIG. 9 shows an auger and rotary encoder partially removed from a delivery conduit.
Figure 10:
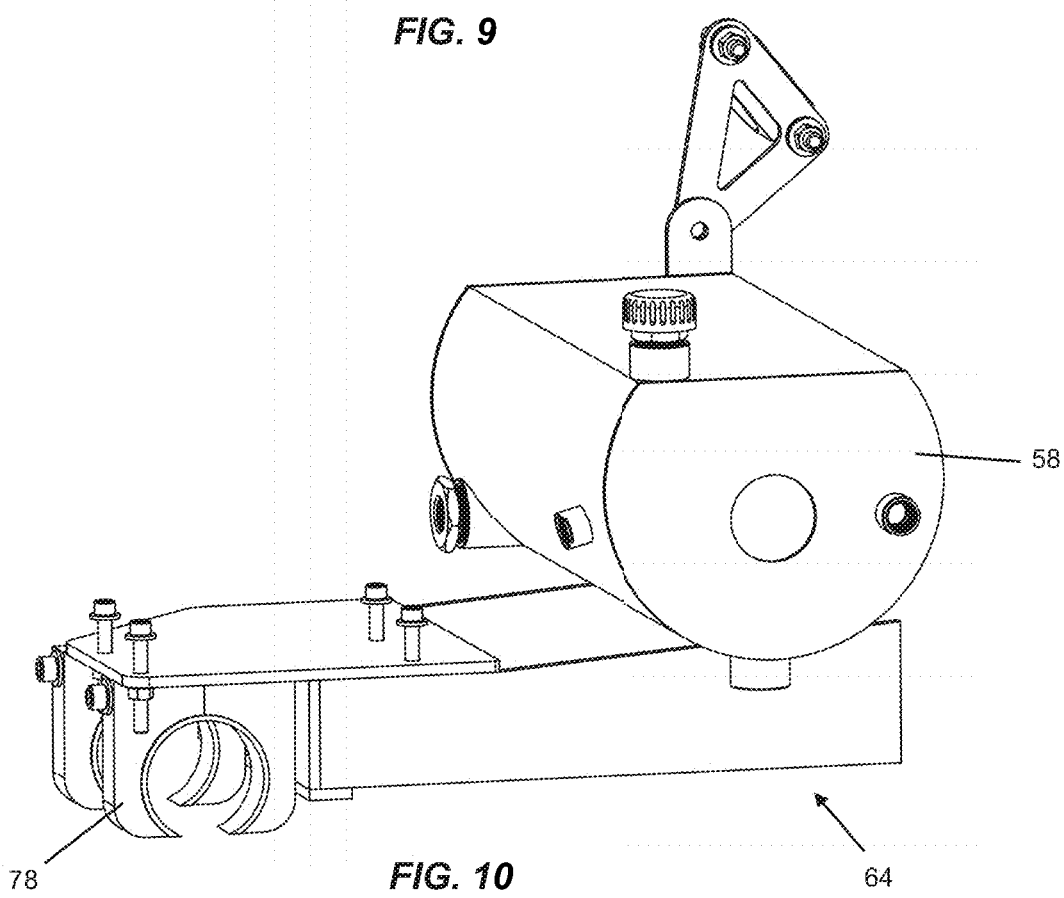
FIG. 10 shows a hydraulic system mount detached from the aircraft.
Figure 11:
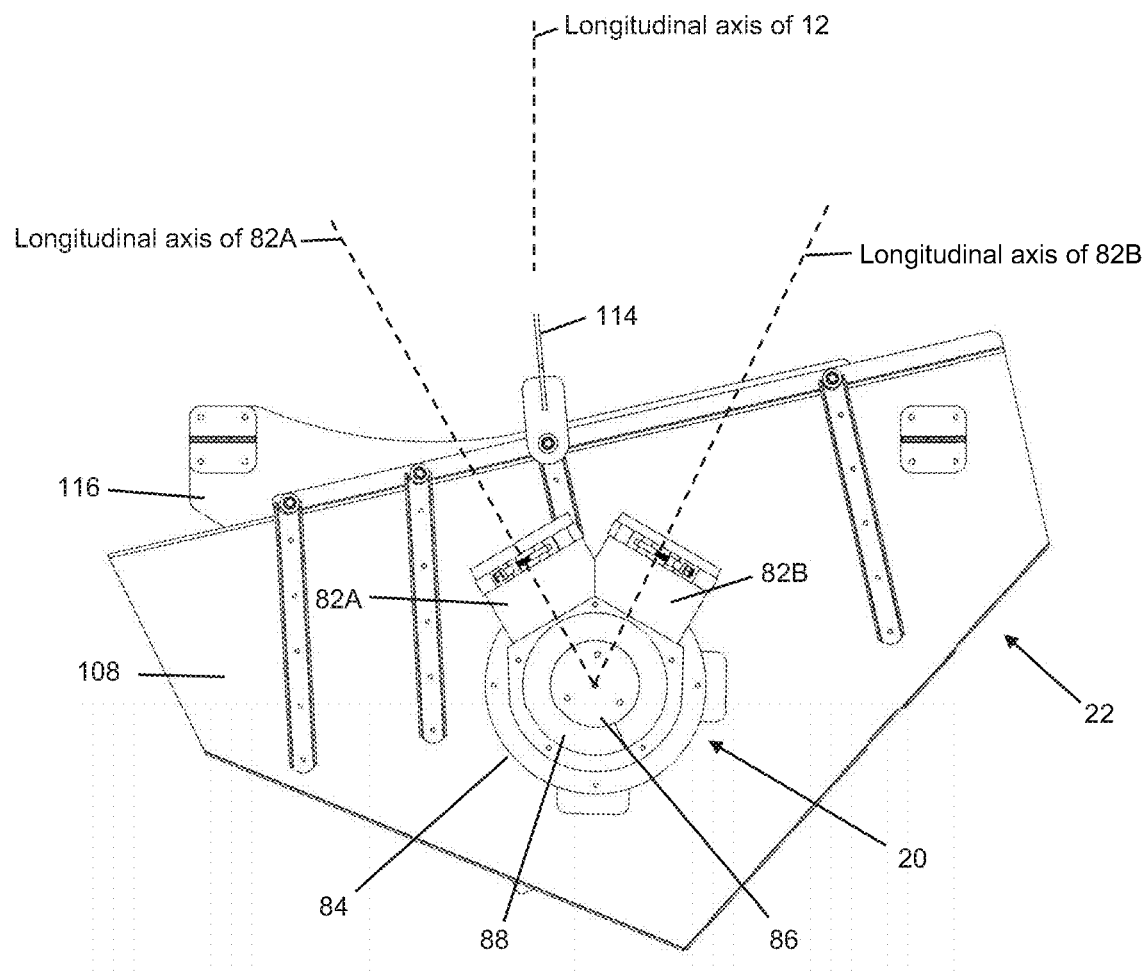
FIG. 11 shows a top view of a collector assembly and distribution assembly of the removable aerial application system separated from the other components of the removable aerial application system.
Figure 14:
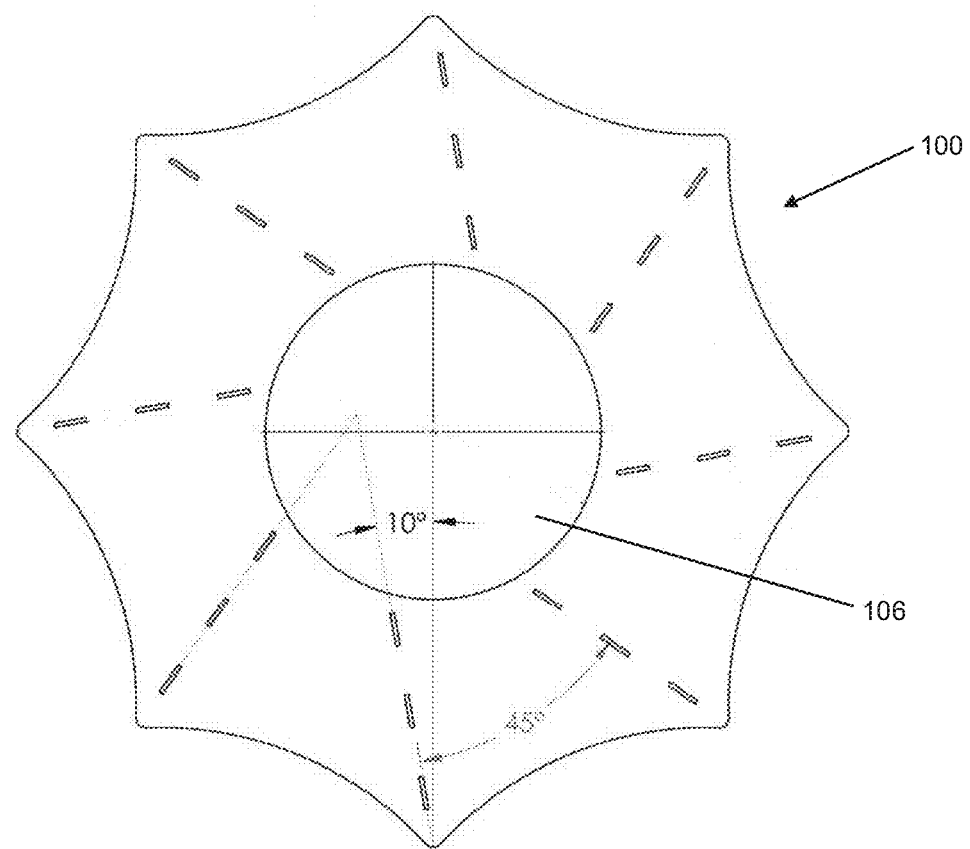
FIG. 14 shows a detailed view of a spinner of the removable aerial application system.
Figure 15:
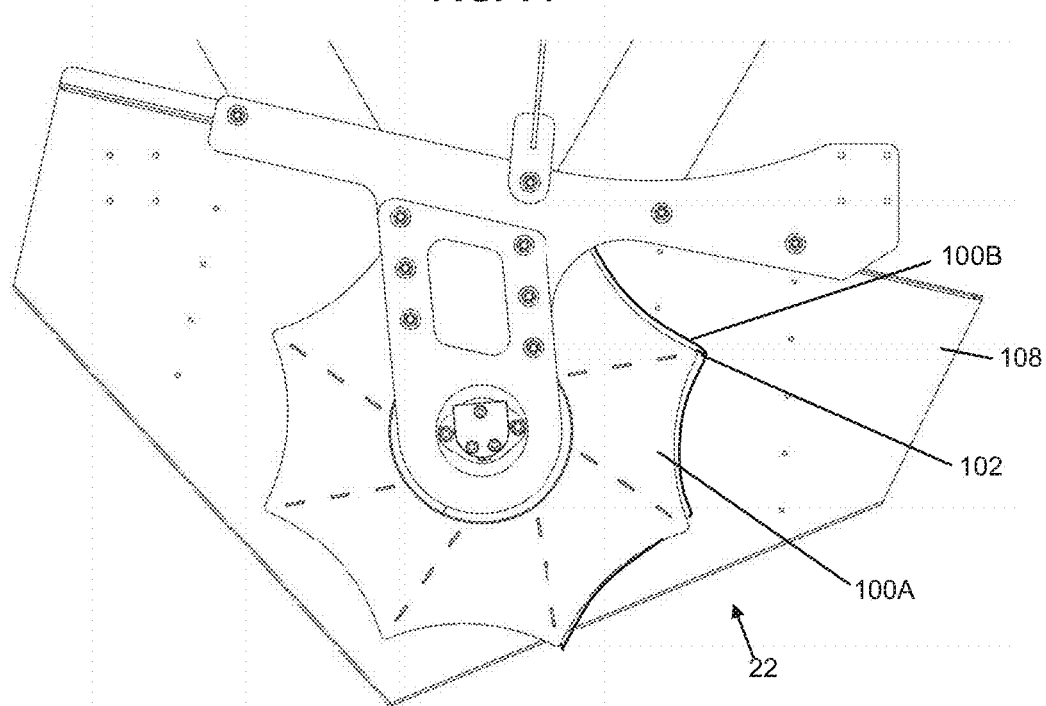
FIG. 15 shows a bottom view of the distribution assembly of the removable aerial application system.

Referring now to FIGS. 7-15, the removable aerial application system 10 is shown in more detail. FIG. 7 shows a side view of the removable aerial application system 10 separated from the aircraft 12 and FIG. 8 shows a top view of the removable aerial application system 10 separated from the aircraft 12 and without the tank 14. FIG. 9 shows an auger and rotary encoder partially removed from a delivery conduit 18; FIG. 10 shows a hydraulic system mount detached from the aircraft 12; FIGS. 11 and 12 shows a top view and a front perspective view, respectively, of a collector assembly 20 and distribution assembly 22; FIG. 13 shows a flow diverter of the collector assembly 20; FIG. 14 shows a spinner of the distribution assembly 22; and FIG. 15 shows a bottom view of the distribution assembly 22.

Continuing to refer to FIG. 7-15, the removable aerial application system 10 is shown in FIGS. 7 and 8 separated from the aircraft 12. In one embodiment, the tank 14 includes a floor 34 between the first and second ends 14A, 14B, which includes a first outlet and a second outlet. In one embodiment, the first outlet is proximate the first end 14A of the tank 14, such that the first outlet is located outside the fuselage 28 and the second outlet is proximate the second end 14B of the tank 14, such that the second outlet is located outside the fuselage 28 (for example, as shown in FIGS. 1-6). Each outlet includes a valve 38 (for example, a manual valve operable by the user) for selectively preventing or allowing the material within the tank 14 to flow out the outlet. In one embodiment, the floor 34 of the tank 14 is sloped from a midpoint of the floor toward each of the first and second outlets to facilitate flow of seed or other material to the outlets (for example, as shown in FIG. 17). The tank 14 also includes at least one filling inlet 42 and at least one vent outlet 44. In one embodiment, the vent outlet 44 is covered with a screen to prevent materials from exiting the tank 14. In one embodiment, the tank 14 is composed of a lightweight material, such as fiberglass, plastic composite or aluminum. Optionally, the tank 14 may include internal molded bracing or framework for rigidity.

Continuing to refer to FIGS. 7-15, in one embodiment, the two loading conduits 16 include a first loading conduit 16A in fluid communication with the first outlet and a second loading conduit 16B in communication with the second outlet. In one embodiment, the loading conduits 16A, 16B are vertically arranged so seeds or other material may easily flow by gravity from the tank 14 into each loading conduit 16A, 16B. In one embodiment, the loading conduits 16A, 16B are composed of a flexible material, such as rubber or silicone. In one embodiment, the loading conduits 16A, 16B and are formed as a bellows. Alternatively, the loading conduits 16A, 16B are composed of a more rigid but lightweight material, such as composite plastic or aluminum. Further, it will be understood that each loading conduit 16A, 16B may be composed of a different material and/or have different physical and structural properties (for example, one loading conduit may be formed as a flexible bellows, whereas the other loading conduit may be formed as a rigid or semi-rigid linear tube).

Continuing to refer to FIGS. 7-15, in one embodiment the two delivery conduits include a first delivery conduit 18A in communication with the first loading conduit 16A and a second delivery conduit 18B in communication with the second loading conduit 16B. Unlike the loading conduits 16A, 16B, the delivery conduits 18A, 18B are, in one embodiment, horizontally, or at least substantially horizontally, arranged and extend from the loading conduits 16A, 16B aftward beneath the fuselage 28. Further, in one embodiment the delivery conduits 18A, 18B extend in a direct that is approximately 90° (±25°) from the direction in which the loading conduits 16A, 16B extend. Each delivery conduit 18A, 18B includes an inlet end 46 in fluid communication with a corresponding loading conduit 16A, 16B and an outlet end 48 in fluid communication with the collector assembly 20. In one embodiment, the collector assembly 20 is mounted to the fuselage 28 (such as to the bottom or lower surface of the fuselage 28) at a location that is aftward of the tank 14. Each delivery conduit 18A, 18B may also include an auger (screw impeller) 50 of various sizes therein for moving seeds or other materials along and within the delivery conduit 18A, 18B to the collector assembly 20 (for example, as shown in FIG. 9). In one embodiment, each of the delivery conduits 18A, 18B is coupled to an associated landing skid 52 (or hard point located at various stations along the aircraft) by, and stabilized by, a coupling device such as a tube clamp. In one embodiment, each of the delivery conduits 18A, 18B is composed of a rigid lightweight material, such as aluminum, and have an elongated tubular shape. Additionally, in one embodiment each of the augers 50 is composed of a lightweight material, such as plastic, fiberglass, aluminum, composite, or other material.

Continuing to refer to FIGS. 7-15, each auger 50 is in communication with the hydraulic system 24, which can be controlled by the user to adjust the application rate. The augers 50 may also be interchanged with replacement augers of different lengths, flank angles, pitches, or the like to adjust movement of the seed or other material through the delivery conduits. In one embodiment, the hydraulic system 24 includes a hydraulic pump 56 (for example, a HONDA® (Honda Motor Co., Ltd., Japan) air-cooled hydraulic pump), a hydraulic fluid tank 58, at least one valve, at least one motor 60, appropriate hoses, at least one electric solenoid for accurate flow control, and an attachment element for securing the hydraulic system 24 to one or more locations on the aircraft 12. In one embodiment, the hydraulic system 24 includes a hydraulic system mount 64 for attaching the hydraulic system 24 to the landing skid 52. A non-limiting example of a hydraulic system mount 64 is shown in FIG. 10 and discussed in greater detail below.

Continuing to refer to FIGS. 7-15, in one embodiment, the hydraulic system 24 further includes various other components, such as at least one gauge or meter, at least one valve (for example, two valves), at least one motor (for example, three motors), and at least one electric solenoid (for example, two electric solenoids), and the like. The electric solenoids may be housed within an aluminum valve block. In one embodiment, the motor 60 uses power from the aircraft's 12 native power system to turn on the motor 60, but once on, the motor 60 may not need any additional power from the aircraft 12. This is particularly advantageous when using aircraft 12 that produce only small amounts of power that is needed for operating the aircraft 12 and cannot be spared for add-on components. In one embodiment, the hydraulic system 24 further includes processing circuitry 66 (such as a memory and processor) and a wired or wireless communication module 68 that allows the hydraulic system 24 to send and/or receive data to and from one or more control units 70 within the aircraft 12. For example, the one or more control units 70 may include a GPS navigation system. In one non-limiting example, the GPS navigation system may be the AG-NAV® (Ag-Nav Inc., Canada) system or similar. The GPS navigation system may include a user input device, such as a touchscreen and/or one or more buttons, nobs, or the like, with which the user can adjust application rate. This information may then be communicated from the GPS navigation system to the hydraulic system 24.

Continuing to refer to FIGS. 7-15, in one embodiment each auger 50 is in communication with a rotary encoder 72 that is configured to convert the angular position or motion of the auger 50 to an analog and/or digital signal. An auger 50 mechanically coupled to a rotary encoder 72 is shown in FIG. 9, partially removed from the delivery conduit 18 to enhance visualization. In one embodiment, each rotary encoder 72 is in mechanical communication with a first end 74A of the corresponding auger 50 that is closer to the collector assembly 20 and the hydraulic system 24. The rotary encoder 72 is in communication with the communication module 68 of the hydraulic system 24 and/or the aircraft control unit(s) 70, such as the GPS navigation system. Thus, each rotary encoder 72 provides information directly or indirectly to the GPS navigation system about the speed and desired application width giving the auger 50 the desired revolutions per minute (RPM) at which the auger 50 should rotate. In one embodiment, the GPS navigation system is programmed to correlate the rotational speed of the auger 50 to the ground speed of the aircraft 12 to calculate an application rate, and to then communicate the application rate to the user through, for example, a display (such as a display within the cabin 26 of the aircraft 12). In one embodiment, the display is a touchscreen display, which is configured to accept user input for adjusting the application rate. If the user adjusts the application rate, the GPS navigation system communicates the new application rate directly and/or indirectly (for example, through the communication module of the hydraulic system 24) to the hydraulic system 24. The hydraulic system 24 then adjusts the rotational speed of the augers 50, which in turn adjusts the application rate of seeds or other material (for example, the processing circuitry 66 of the hydraulic system is programmed to increase or decrease the rotational speed of one or both augers 50).

Continuing to refer to FIGS. 7-15, in one embodiment the hydraulic system is mounted or affixed to one of the landing skids 52 or fuselage 28 of the aircraft 12 using the hydraulic system mount 64. In one embodiment, the aircraft 12 is an R44 produced by the Robinson Helicopter Company (California) and the hydraulic system mount 64 is mounted to the left landing skid 52 (as shown in FIGS. 1, 2, 5, and 6). As in shown in FIGS. 1 and 2, in one embodiment the hydraulic system mount 64 is mounted to the landing skid 52 by one or more landing skid clamps 78. In one embodiment, the hydraulic fluid tank 58 is attached to the inboard side of the hydraulic system mount 64 (for example, as shown in FIG. 10) and the hydraulic system mount 64 includes a platform to which the motor 60 may be mounted. The hydraulic system 24 is in communication with each auger 50 via the one or more hoses, valves, and/or electric solenoids.

Continuing to refer to FIGS. 7-15, the collector assembly 20 and the distribution assembly 22 are shown in more detail in FIGS. 11-15. The collector assembly 20 and the distribution assembly 22 together may be referred to as a delivery unit 80. In one embodiment, the components of the collector assembly 20 and the distribution assembly 22 are composed of at least one lightweight material, such as aluminum, composite, or the like. In one embodiment, the collector assembly 20 is mounted above (that is, closer to the aircraft's fuselage than) the distribution assembly 22. In one embodiment, the delivery unit 80 is located in the center of the aircraft 12 beneath the beginning of the tail section of the fuselage 28.

Continuing to refer to FIGS. 7-15, —in one embodiment, the collector assembly 20 generally has a tubular shape and includes a first inlet 82A coupled to the first delivery conduit 18A and a second inlet 82B coupled to the second delivery conduit 18B. The collector assembly 20 is shown in FIGS. 11 and 12 separated from the delivery conduits 18A, 18B. In the embodiment shown in FIGS. 11 and 12, each inlet 82A, 82B has a longitudinal axis, and the longitudinal axes of the first and second inlet 82A, 82B are offset from each other by an angle α of between approximately 30° and approximately 45° (±10°). However, it will be understood that this angle α may be of any suitable value, depending on such factors as the width of the aircraft 12 and length of the delivery conduits 18A, 18B (that is, the distance between the loading conduits 16A, 16B and the collector assembly 20).

Continuing to refer to FIGS. 7-15, the collector assembly 20 includes a body 84 that defines a chamber 86, in which a flow diverter 88 is at least partially located. Further, in one embodiment, the collector assembly 20 includes a cap 90 that is used to enclose the chamber 86 (the cap 90 is not shown in FIGS. 11 and 12). The flow diverter 88 is shown in FIGS. 13A and 13B. In one embodiment, the flow diverter 88 is a disk with a central aperture 92 and a projection 94 that extends through the central aperture 92 and lies in a plane that is orthogonal to, or at least substantially orthogonal to, the plan in which the disk portion of the flow diverter 88 lies. In one non-limiting example, the projection 94 (shown in FIG. 13A) has a width of approximately 3.25 inches and extends through the central aperture 92 at a right-angle bend for a distance of approximately 2.00 inches (shown in FIG. 13B). The flow diverter 88 may also include one or more slits 96 in an annular edge region 98 that engage with one or more complementary connection features of the collector assembly 20, such as of the body 84 in which the flow diverter 88 is located. This allows the flow diverter 88 to be rotated over a predetermined distance to adjust the location of the projection 94, which allows for adjustment of the flow of seed or other material through the flow diverter 88 (and over and/or around the projection 94) and toward the distribution assembly 22. Thus, the flow diverter 88 manages seed location through the collector assembly body 84 and displaces the seed into a spinner 100 of the distribution assembly 22 for more accurate loading. For example, use of the flow diverter 88 may cause the seed to be distributed in a 180° pattern by the spinner 100, rather than a 360° pattern as might otherwise be produced when seed flows into the rotating spinner unhindered.

Continuing to refer to FIGS. 7-15, in one embodiment, the spinner 100 is below (that is, farther from the aircraft's fuselage 28 than) the flow diverter 88. FIG. 15 shows a lower view of the distribution assembly 22. The spinner 100 (which may also be referred to as an agitator, distributor, or impeller) is, in one embodiment, a disk having flukes, ridges, undulations, fins, apertures, channels, baffles, projections, protrusions, and/or other features on the edge of the disk and/or on the upper and/or lower surface (which may collectively be referred to as "features" 102) that allow it to more efficiently spin seed or other material out of the spinner 100 as the spinner 100 rotates. During operation, the spinner 100 rotates at a constant RPM and may rotate in a clockwise direction. In one embodiment, the spinner 100 includes two parallel and planar, or at least substantially planar, plates 100A, 100B with one or more features 102 extending therebetween, creating one or more passages, each passage defining an outlet 104, through which the seed can travel and exit the delivery unit 80. Or, put another way, the spinner 100 may include a first plate 100A and a second plate 100B that are connected by one or more features 102 extending therebetween and defining a plurality of outlets 104 (for example, the outlets 104 are shown in FIG. 7). In one non-liming example, the spinner 100 includes a first plate 100A lying in a first plane, a second plate 100B lying in a second plane, and a plurality of baffles 102A that each lie in a plane that is orthogonal to, or at least substantially orthogonal to, the planes in which the first and second plates 100A, 100B, and which extend between the first and second plates 100A, 100B. In this example, the spaces between the baffles 102A are passages through which the seed may pass. In one embodiment, the dashed marks shown on the spinner 100 in FIGS. 14 and 15 indicate weld marks where the features 102 are welded between two plates 100A, 100B. Alternatively, the spinner 100 may include one plate or planar surface from which one or more features extend. Thus, the features 102 may acts as paddles or baffles to distribute the seed or other material from the delivery unit 80. In one embodiment, the features 102 include a plurality of baffles 102A that are axially arranged about a central aperture 106 in the spinner 100, and each baffle 102A is oriented at an angle of less than 90° from a diameter of the spinner 100. Further, in one non-limiting example, the baffles 102A are at an angle of approximately 45° from each other (as shown in FIG. 14).

Continuing to refer to FIGS. 7-15, in one embodiment the collector assembly 20 is mounted above (that is, closer to the aircraft's fuselage than) the distribution assembly 22. The collector assembly 20 may be removably or permanently coupled to a housing or wind deflector 108 of the distribution assembly 22. For example, the body 84 of the collector assembly 20 may be welded or manufactured as an integrated unit with the housing 108 of the distribution assembly 22. Or, the body 84 of the collector assembly 20 may be removably coupled to the housing 108 of the distribution assembly 22, such as with one or more clamps, clips, or other mechanical coupling means. In one embodiment, the housing 108 is generally planar and defines a central aperture that is in communication with the chamber 86 of the body 84 of the collector assembly 20 on one side of the aperture and the spinner 100 on the opposite side of the aperture.

Continuing to refer to FIGS. 7-15, in one embodiment, the distribution assembly 22 also includes a center brace 110 and two side braces 112. The center brace 110 is configured to be coupled to the aircraft's 12 cargo hook mounting fixture, or other secure mounting fixture, located on the bottom surface of the fuselage 28. In one embodiment, the side braces 112 include a first side brace 112A on the left (port) side of the center brace 110 and a second side brace 112B on the right side (starboard) of the center brace 110. In one embodiment, the side braces 112A, 112B are configured to be coupled to the location at which the landing skids 52 attach to the fuselage 28, and the same bolt holes may be used for the side braces 112A, 112B and landing skids 52. In one non-limiting example, the delivery unit 80 is secured to an aft cross tube between the landing skids 52. In one embodiment, the center brace 110 is connected to the housing 108 of the distribution assembly 22 at an angle (for example, as shown in FIG. 11) such that the housing 108 is rotated about a vertical axis, causing the left side (or first edge) of the housing 108 to be located more aftward than the right side (or second edge) of the housing 108. Put another way, the housing 108 is canted relative to the square or box configuration of the landing skids 52. This intentional misalignment of the housing 108 provides the same trajectory to seed exiting the righthand side of the spinner 100 as seed exiting the lefthand side of the spinner 100. In one embodiment, the center brace 110 includes an arm 114 that is hingedly connected to the delivery unit 80 (for example, to the housing 108) and a platform 116 that is fixedly connected to the delivery unit 80 (for example, to the housing 108) to secure the delivery unit in place once the delivery unit has been canted to the desired degree.

During operation of the removable aerial application system 10, seed (or other material) flows by gravity from the tank 14 into each of the loading conduits 16. Before flight, the valves 38 of the tank outlets are opened and the seed passes from the tank 14 into the loading conduits 16, and at least some seed then passes into the delivery conduits 18. The seed will remain in the loading conduits 16 and/or delivery conduits 18 until the augers 50 begin rotating. Rotation of the augers 50 advances the seed from the tank 14 and through the delivery conduits 18. The speed of the auger 50 is controlled by the hydraulic system 24, which in turn may be controlled directly by the user and/or through a control unit 70 in the aircraft 12. The augers 50 advance the seed into the collector assembly 20, where it passes through the flow diverter 88 (and over and/or around the projection 94, which may be adjusted to meter flow of the seed therethrough), through the collector assembly body 84 and then into the spinner 100. Delivering seed to the collector assembly 20 through two delivery conduits 18 provides even distribution of the seed as it enters the collector assembly 20. The spinner 100 then ejects the seed through the one or more passages and out of the one or more outlets 104 of the housing 108 of the distribution assembly 22. In one embodiment, the seed is ejected from the distribution assembly 22 in a swath of approximately 180°. This system allows for the even flow and controllable distribution of seed or other materials. The application rate may also be adjusted as discussed above, either manually or automatically based on ground speed of the aircraft and selected distribution swath width, through the control and adjustment of the augers rotating within the delivery conduits 18.

Referring now to FIGS. 16 and 17, installation and removal of the removable aerial application system 10 is discussed. Installation of the removable aerial application system 10 into the aircraft 12 takes advantage of pre-existing mounting points in and/or on the aircraft 12. For example, three general areas of the removable aerial application system 10 may be coupled to the aircraft 12: the delivery unit 80 (collector assembly 20 and distribution assembly 22); the delivery conduits 18; and the tank 14 (for example, as shown in FIGS. 1-6).

Continuing to refer to FIGS. 16 and 17, and as shown in FIGS. 1-6, the delivery unit 80 is coupled to the aircraft's 12 cargo hook mounting fixture, or other secure mounting fixture, on the bottom surface of the fuselage 28 with the center brace 110 that is coupled to the distribution assembly 22, and the delivery unit 80 is coupled to the aft cross tube of the landing skids with the side braces 112 (which may also be referred to as sway braces). In one embodiment, the removable aerial application system 10 includes a first side brace 112A coupled to the aft cross tube toward the left (port) side of the aircraft 12 and a second side brace 112B coupled to the aft cross tube toward the right (starboard) side of the aircraft 12.

Each delivery conduit 18 is coupled to an associated landing skid 52 by, and is stabilized by, at least one tube clamp 118. For example, the first delivery conduit 18A is coupled to the left landing skid 52A using at least one tube clamp 118 and the second delivery conduit 18B is coupled to the right landing skid 52B using at least one tube clamp 118 (for example, as shown in FIG. 4). In one embodiment, two L-brackets 120 are coupled to the aircraft 12 at a pre-existing mounting points, on the lower center surface of the fuselage 28 (for example, as shown in FIG. 4). For example, the L-brackets 120 may be installed by removing a bolt at this location and then re-bolting to secure the L-brackets 120. The tube clamps 118 are then coupled to the L-brackets 120, and each delivery conduit 18 is inserted through an aperture in the corresponding tube clamp 118. The aft or outlet end 48 of each delivery conduit 18 is the inserted into or coupled to a corresponding inlet 82 of the collector assembly 20.

Once the delivery unit 80 and delivery conduits 18 are in place, the hydraulic system 24 is mounted to the aircraft. The hydraulic system 24 is placed on one landing skid 52 (for example, the left landing skid, as shown in FIGS. 1-6). At least one landing skid clamp 78 is used to securely couple the hydraulic system 24 to the skid 52. The hydraulic system hoses and drive components are then coupled to the augers 50 of the delivery conduits 18.

Next, as is shown in FIGS. 16 and 17, the tank 14 is easily installed within the cabin 26 of the aircraft 12. In one embodiment, the rear cabin doors 32 are removed to facilitate insertion of the tank 14 into the cabin. 26 If the aircraft 12 includes back-row seats, those seats are also removed to make space for the tank 14. Optionally, as shown in FIG. 16, the seatbacks 124 may be left in place, while the seat cushions are removed from the seating frame 126. A lower tank support with dialing or holding brackets may be mounted to the seating frame to help support the tank. Also, longer tank support belts may be installed into the existing seatbelt attachment fixtures and/or belt extensions may be affixed to the working ends of the existing seatbelts.

As shown in FIG. 17, the tank 14, uncoupled from the loading conduits 16, is inserted into the back area of the cabin 26, where it rests on the seating frame 126. In one embodiment, the tank 14 includes a centering bolt that is configured to mateably couple the tank 14 to an aperture or indentation in the lower tank support. The coupling between the centering bolt and lower tank support aligns the tank 14 laterally within the cabin 26. In one embodiment, the tank support belts are then arranged over the tank 14 and pulled tight to secure the tank 14. When the tank 14 is properly placed or seated within the cabin 26, the first outlet of the tank 14 will be located external to the cabin 26 on the left side of the aircraft 12 and the second outlet of the tank 14 will be located external to the cabin 26 on the right side of the aircraft 12.

Finally, the loading conduits 16 are then coupled between the tank outlets and the inlet ends 46 of the delivery conduits 18. As the loading conduits 16 are flexible, they are easily installed when the tank 14 and the delivery conduits 18 are already mounted in place.

The removable aerial application system 10 is easily removed from the aircraft 12 by reversing the above steps. As installation and operation of the removable aerial application system 10 does not require modification of the aircraft itself, the aircraft 12 once again meets the requirements of a standard category airworthiness certificate and can be operated for non-restricted use once the removable aerial application system 10 is removed.

Figure 18:
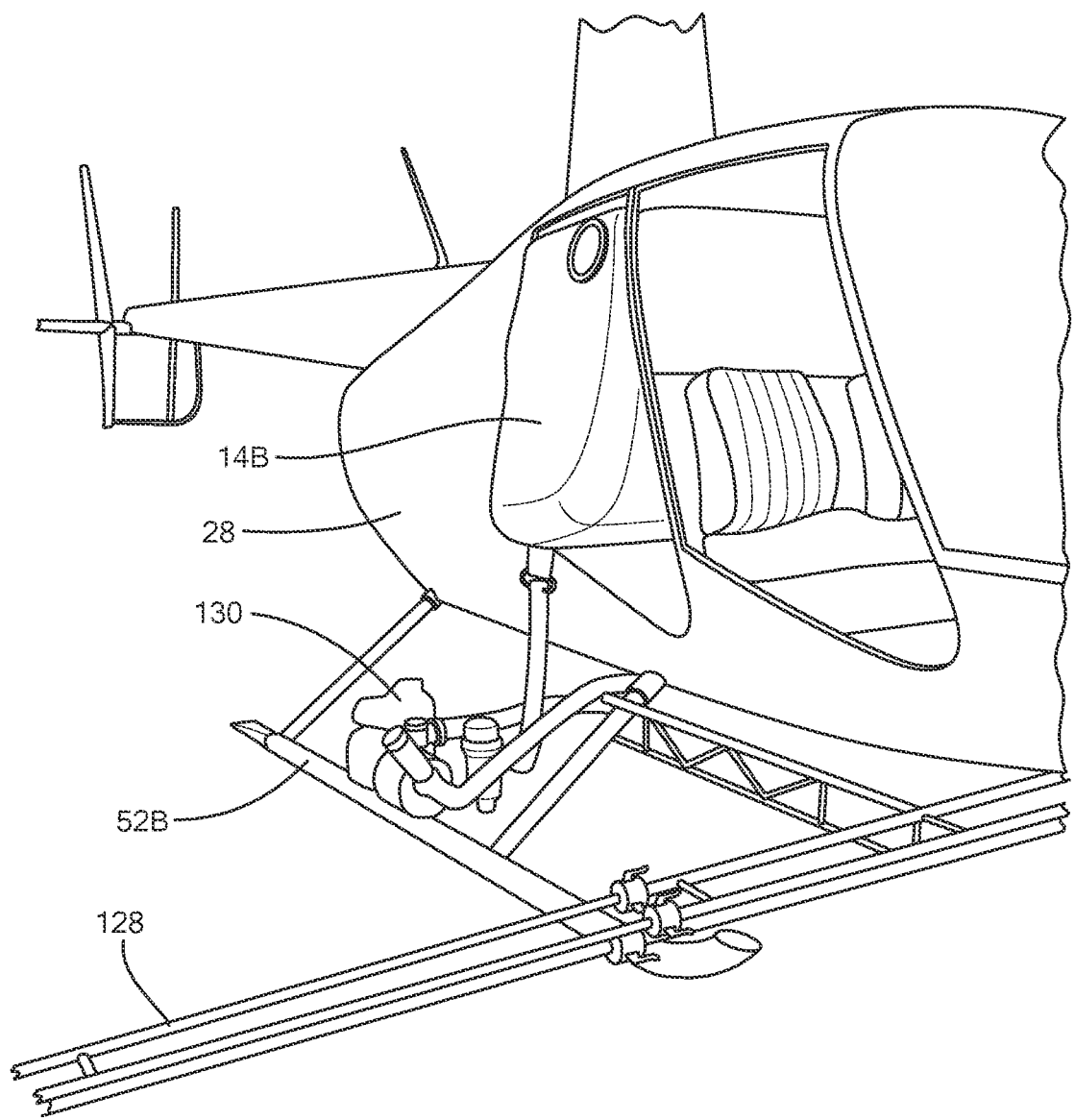
FIG. 18 shows a forward perspective right side view of an aircraft including a removable aerial application system for delivering wet materials.
Figure 19:
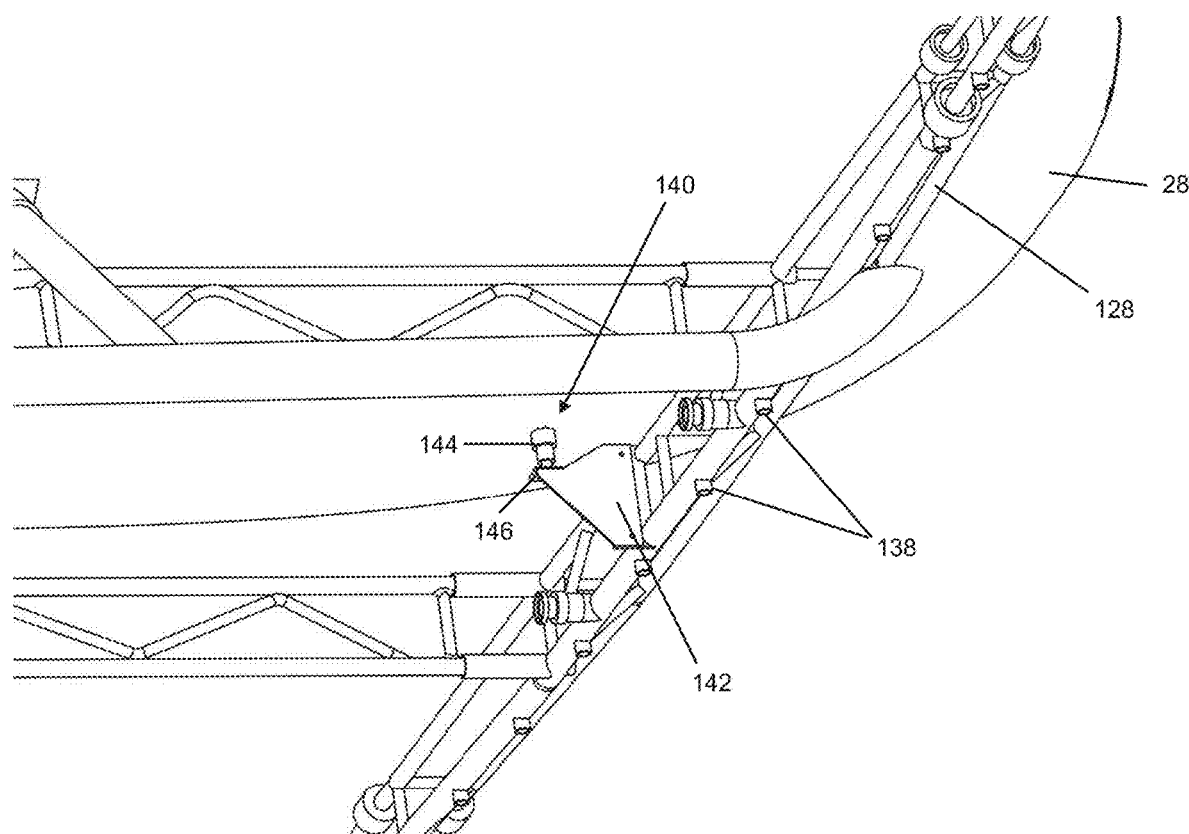
FIG. 19 shows a mounting mechanism for a spray boom of the removable aerial application system for delivering wet material.

Referring now to FIGS. 18 and 19, an aircraft with a removable aerial application system 10 for delivery of wet materials is shown. FIG. 18 shows a forward perspective right side view of an aircraft including a removable aerial application system 10 for delivering wet materials and FIG. 19 shows a mounting mechanism for a spray boom 128 of the removable aerial application system 10 for delivering wet material. As noted above, the removable aerial application system 10 may also be used to apply wet materials. Accordingly, components used for the dry materials system may be replaced or interchanged with components used for the wet materials system. When switching from dry to wet materials application, the tank 14 remains in place but the rest of the system is removed. For example, the valves 38 between the tank outlets and loading conduits 16 are uncoupled from the tank 14 and the delivery conduits 18, hydraulic system 24, and delivery unit 80 are also disconnected from the aircraft 12. Instead, in one embodiment a pump system 130, which includes one or more hoses, a fluid pump, a fluid supply, and spray booms 128, is connected to the tank 14 and the aircraft 12 in their place.

In one embodiment, the spray booms 128 are composed of a lightweight material, such as aluminum, composite, or the like. The removable aerial application system 10 may include between one and three spray booms 128, although it will be understood that more than three may be used. Each spray boom 128 includes at least one nozzle 138, and the nozzle(s) 138 may have any suitable outlet, shape, size, bracing, etc. Like the dry materials system, the components of the wet materials system are mounted solely to existing mounting fixtures or hard points of the aircraft 12. For example, the components of the wet materials system may be coupled to the landing skid(s) 52, cross-tubes, fuselage 28, and/or other parts of the aircraft 12. In one embodiment, the spray boom(s) project forward of the pilot for clear visibility. This also allows the spray booms 128 to be securely coupled to a pre-existing mounting fixture or hard point of the aircraft 12 forward of the landing skids 52 in the center of the aircraft fuselage 28, creating a triangular-shaped support that gives lateral and longitudinal stability and strength. An exemplary mounting mechanism 140 is shown in FIG. 19. In this embodiment, the mounting mechanism 140 is a spring-loaded quick-acting coupling that is configured to removably couple the mounting body 142 (forward load) of the spray boom(s) 128 to the underside of the fuselage 28 and to connect/disconnect the fluid supply from the tank to the spray boom(s) 128. The mounting mechanism 140 may include a first portion 144 that is coupled to the underside of the fuselage 28 and a second portion 146 that is coupled to the spray boom mounting body 142. Each of the first and second portions 144, 146 may include a valve, so fluid may pass to the spray boom(s) 128 only when the first and second portions 144, 146 are connected. The first and second portions 144, 146 may be connected by, for example, a ball-lock coupling, roller-lock coupling, pin-lock coupling, flat-faced coupling, bayonet coupling, ring-lock coupling, cam-lock coupling, or the like.

In one embodiment, the pump of the wet materials system is a HONDA® air-cooled standalone pump, although any suitable pump may be used. Further, the pump is mounted to the same mount on the landing skid 52 as the hydraulic system 24 in the dry materials system (referred to as the hydraulic system mount). The pump includes a flow control system and electric start. The pump is in fluid communication with the spray boom(s) though one or more hoses and one or more valves and, like the dry materials system, the pump system may include processing circuitry (for example, a memory and processor) and a wired or wireless communication module that allows the pump system to send and/or receive data to and from one or more control units within the aircraft. In one embodiment, the processing circuitry and/or other electrical components from the dry materials system (hydraulic system) may also be used in the wet materials system (pump system).

The one or more valves may be automatically or semi-automatically operated by the processing circuitry and/or the control unit(s) 70, or manually operated by the user prior to flight. The valve(s) are used to divert, separate, and/or recirculate fluid for mixing purposes, as well as to control application of wet materials. The pump may be connected to the tank such that the pump draws fluid from both the first and second outlet of the tank, allowing for complete evacuation of liquid from the tank. Further, the pump system and/or the tank may include one or more filters that the fluid passes through before distribution from the spray boom(s).

Embodiments

Some embodiments advantageously provide a removable aerial application system and a method of installing the removable aerial application system in an aircraft such as a helicopter. In one embodiment, a removable aerial application system for an aircraft comprises: a tank insertable into a cabin of the aircraft; a first delivery conduit and a second delivery conduit, the first and second delivery conduits being in communication with the tank and extending aftward beneath a fuselage of the aircraft, a first auger within the first delivery conduit and a second auger within the second delivery conduit; a collector assembly defining a chamber, each of the first and second delivery conduits being in communication with the chamber; a distribution system coupled to the collector assembly; and a hydraulic system in mechanical communication with each of the first and second augers.

In one aspect of the embodiment, the tank includes a first outlet at a first end and a second outlet at a second end opposite the first end, the first outlet being located external to the left side of the aircraft and the second outlet being located external to the right side of the aircraft when the tank is inserted into the cabin of the aircraft. In one aspect of the embodiment, the removable aerial application system further comprises a first loading conduit extending vertically between the first tank outlet and the first delivery conduit and a second loading conduit extending vertically between the second tank outlet and the second delivery conduit.

In one aspect of the embodiment, the hydraulic system includes processing circuitry in communication with a navigation system of the aircraft.

In one aspect of the embodiment, the processing circuitry has a wireless communication module.

In one aspect of the embodiment, the removable aerial application system further comprises a first rotary encoder in communication with the first auger and a second rotary encoder in communication with the second auger, each of the first and second rotary encoders also being in communication with the processing circuitry.

In one aspect of the embodiment, the collector assembly includes a flow diverter having a central aperture and a projection extending into the central aperture.

In one aspect of the embodiment, the distribution system includes a wind deflector, the wind deflector having a central aperture in communication with the chamber of the collector assembly; a first edge; and a second edge opposite the first edge, the wind deflector being rotated about a vertical axis such that the first edge is more aftward than the second edge.

In one embodiment, a removable aerial application system usable with a helicopter having a cabin, landing skids, and a fuselage includes: a tank insertable into the aircraft cabin; a delivery unit removably coupled to a pre-existing mounting fixture on a lower surface of the aircraft fuselage at a location that is aftward of the tank; two delivery conduits in communication with the tank and the delivery unit; an auger in each of the two delivery conduits; and a hydraulic system in communication with the augers, the hydraulic system being removably coupled to the landing skids.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A removable aerial application system for an aircraft, the removable aerial application system comprising:
- a tank configured to be inserted into a cabin of the aircraft;
- a first delivery conduit and a second delivery conduit, the first delivery conduit and the second delivery conduit being in communication with the tank and being configured to extend afterward beneath a fuselage of the aircraft;
- a first auger within the first delivery conduit and a second auger within the second delivery conduit;
- a collector assembly having a body defining a chamber, each of the first delivery conduit and the second delivery conduit being in communication with the chamber, the collector assembly including:
  - a rotatable flow diverter, the flow diverter being a disk having a central aperture, a projection transitionable between a first location and a second location different than the first location when the flow diverter is rotated, and an annular edge region;
  - at least one slit defined within the annular edge region and configured to engage the body of the collector assembly such that the flow diverter may be rotated over a predetermined distance to transition the projection to the second location; and
- a distribution assembly coupled to the collector assembly, the distribution assembly including a spinner in communication with the chamber of the collector assembly;
- a hydraulic system in mechanical communication with each of the first and second augers;
- a first loading conduit directly connected to the first delivery conduit, the first loading conduit extending vertically between the tank and the first delivery conduit; and
- the spinner being configured to disperse a flow of material in a 180° pattern when the projection is in the second location.

2. The removable aerial application system of claim 1, wherein the tank includes a first outlet at a first end and a second outlet at a second end opposite the first end, the tank being configured such that the first outlet is located external to a left side of the aircraft and the second outlet is located external to a right side of the aircraft when the tank is within the cabin of the aircraft, the first loading conduit extending vertically between the first outlet of the tank and the first delivery conduit.

3. The removable aerial application system of claim 2, further comprising:
- a second loading conduit extending vertically between the second outlet of the tank and the second delivery conduit.

4. The removable aerial application system of claim 3, wherein the first loading conduit and the second loading conduit are each composed of a flexible material.

5. The removable aerial application system of claim 1, wherein the hydraulic system includes processing circuitry that is programmed to send and receive data from a navigation system of the aircraft.

6. The removable aerial application system of claim 5, wherein the processing circuitry has a wireless communication module.

7. The removable aerial application system of claim 5, further comprising a first rotary encoder in communication with the first auger and a second rotary encoder in communication with the second auger, each of the first rotary encoder and the second rotary encoder also being in communication with the processing circuitry of the hydraulic system.

8. The removable aerial application system of claim 1, wherein the flow diverter is adjustable to meter the flow of material from the removable aerial application system.

9. The removable aerial application system of claim 1, wherein the distribution assembly includes a housing, the housing having:
- a central aperture in communication with the chamber of the collector assembly;
- a first edge; and
- a second edge opposite the first edge, the housing being rotated about a vertical axis such that the first edge is more afterward than the second edge.

10. The removable aerial application system of claim 1, wherein the spinner includes:
- a first plate and a second plate; and
- a plurality of baffles extending between the first plate and the second plate, the plurality of baffles, the first plate, and the second plate defining a plurality of passages within the spinner, each of the plurality of passages including an outlet.

11. The removable aerial application system of claim 1, wherein, the body of the collector assembly further includes a first inlet and a second inlet, each of the first inlet and the second inlet having a longitudinal axis, the longitudinal axis of the first inlet and the longitudinal axis of the second inlet being oriented relative to each other at an angle.

12. The removable aerial application system of claim 1, wherein the first delivery conduit and the second delivery conduit each have an elongated tubular shape and are composed of a rigid material.

13. The removable aerial application system of claim 11, wherein the angle is between 30° and 45°.

14. The removable aerial application system of claim 1, wherein the distribution assembly further includes a first side brace, a second side brace, and a central brace disposed between the first and second side braces.

15. The removable aerial application system of claim 14, wherein:
- the aircraft includes a plurality of landing skids; and
- the central brace is connected to the housing of the distribution assembly at an angle, the housing of the distribution assembly being rotated about a vertical axis such that a first edge of the housing of the distribution assembly is located more aftward than a right side of the housing of the distribution assembly, with respect to the plurality of landing skids.

* * * * *